US006610407B1

(12) United States Patent
Homi

(10) Patent No.: US 6,610,407 B1
(45) Date of Patent: Aug. 26, 2003

(54) CORROSION RESISTANT COATING FOR AN IRON-BASED PART AND METHOD FOR APPLYING SAME

(75) Inventor: Makoto Homi, Hyogo-ken (JP)

(73) Assignee: Tsubakimoto Chain Co., Osaka (JP)

( * ) Notice: Subject to any disclaimer, the term of this patent is extended or adjusted under 35 U.S.C. 154(b) by 201 days.

(21) Appl. No.: 09/627,539

(22) Filed: Jul. 28, 2000

Related U.S. Application Data

(63) Continuation-in-part of application No. 09/031,153, filed on Feb. 26, 1998.

(51) Int. Cl.⁷ .................. C08L 63/00; C08G 77/00; B32B 15/08
(52) U.S. Cl. .................. 428/416; 521/135; 521/178; 523/459; 428/418
(58) Field of Search .................. 523/459, 458; 524/439, 440; 428/553, 416, 418; 521/178, 135

(56) References Cited

U.S. PATENT DOCUMENTS

| 3,849,141 A | * | 11/1974 | Palm et al. .............. 106/31.43 |
| 3,948,686 A | | 4/1976 | Lochner et al. |
| 4,162,244 A | | 7/1979 | Bertram |
| 4,277,284 A | | 7/1981 | Ginsberg et al. |
| 4,381,334 A | | 4/1983 | Balk et al. |
| 4,391,855 A | | 7/1983 | Geeck |
| 4,436,773 A | * | 3/1984 | Yamabe et al. .............. 427/380 |
| 4,476,260 A | | 10/1984 | Salensky |
| 4,642,011 A | | 2/1987 | Uramoto et al. |
| 5,334,631 A | | 8/1994 | Durand |
| 5,384,345 A | | 1/1995 | Naton |
| 5,399,189 A | | 3/1995 | Glorieux |
| 5,415,689 A | | 5/1995 | Wekenmann et al. |
| 5,580,907 A | | 12/1996 | Savin |
| 5,868,819 A | | 2/1999 | Guhde et al. |
| 6,261,679 B1 | * | 7/2001 | Chen et al. ............... 264/45.2 |

FOREIGN PATENT DOCUMENTS

| DE | 2 227 188 | | 12/1973 |
| JP | 56109261 | | 8/1981 |
| JP | 10068085 A | * | 3/1998 |
| WO | WO 92/11324 | | 7/1992 |
| WO | WO 96/29372 | | 9/1996 |

* cited by examiner

Primary Examiner—Paul Thibodeau
Assistant Examiner—Kevin R Kruer
(74) Attorney, Agent, or Firm—Dann, Dorfman, Herrell & Skillman; Henry H. Skillman

(57) ABSTRACT

A method for treating a fastening part made from an iron-based alloy comprising the steps of degreasing and blasting the part; coating the part with an epoxy resin undercoating; and applying another coating thereon as a finish coat. The epoxy resin undercoating comprises a mixture of a first composition comprising, in parts by weight, about 20–200 parts of a zinc dust, about 0.05–0.5 parts of a thermally expanding powder having micro capsules adapted to explode when heated to form voids in the coating, and provide limited porosity, and about 10 parts of a vehicle mainly composed of an epoxy resin and a second composition comprising, in parts by weight, about 0.2–2.5 parts of an epoxy type silane coupling agent and about 100 parts of the zinc dust.

14 Claims, No Drawings

CORROSION RESISTANT COATING FOR AN IRON-BASED PART AND METHOD FOR APPLYING SAME

RELATED APPLICATION

This application is a continuation-in-part of Application Ser. No. 09/031,153, filed Feb. 26, 1998.

FIELD OF THE INVENTION

This invention relates to a corrosion resistant coating and a method for applying the same and, more particularly, to a corrosion resistant coating and a surface treatment method intended to prevent the corrosion of a fastening part made from an iron-based alloy such as a bolt, nut, washer, drill screw, tapping screw or the like.

BACKGROUND OF THE INVENTION

For many applications, fastening parts made from iron-based alloys such as bolts, nuts, washers, drill screws, and tapping screws, are treated to provide improved corrosion resistance. Typically, the parts are galvanized, either with or without a subsequent chromate treatment, to enhance the corrosion resistance of such parts. The chromated surface of the part is often painted in order to prevent self-corrosion (basic carbonate), to further improve corrosion resistance, and also to finish the fastening part to the same color as a body to which the fastening part is to be applied. Galvanization and chromate treatments are used, at least in part, due to the fact that such treatments are highly protective and inexpensive.

However, infiltration of hydrogen into the part during the pickling and plating steps associated with the galvanization process and the chromating step is inevitable. The infiltration of hydrogen results in hydrogen embrittlement of the part which causes the part to be more susceptible to cracking.

To solve this problem, a surface treatment method has been recently devised comprising undercoating the fastening part with an epoxy resin containing a zinc dust. The unplated part is degreased and blasted prior to painting the part with the epoxy resin. After the resin has been applied, a durable overcoating is applied to the part as a finish coat. Regardless of the painting method employed, the known painted coatings do not adequately adhere to sections of the part having edges, such as threads, due to the surface tension of the coating. This is particularly true for baking type coatings, of which the epoxy resin coatings containing zinc dust used for surface treating fastening parts typically comprise. Since a minimum thickness of the coating is required to impart the natural corrosion preventing performance of the coating to the part, the known coatings cannot provide a sufficiently satisfactory performance with respect to corrosion resistance. Accordingly, it would be highly beneficial to provide an epoxy resin coating containing zinc dust which has an improved ability to adhere to a part so that a sufficient thickness of the coating can be provided, even on or near sections of the part having sharp edges, to provide a part which has good corrosion resistance and is free from hydrogen embrittlement.

SUMMARY OF THE INVENTION

In light of the foregoing, an objective of the present invention is to solve the problems associated with the surface treatment method for fastening parts made from iron-based alloys described above wherein a fastening part is undercoated with an epoxy resin coating containing zinc dust. In particular, the present invention relates to an epoxy resin coating comprising a mixture of a first composition and a second composition. The first composition comprises, in parts by weight, about 20–200 parts of a zinc dust, about 0.05–0.5 parts of a thermally expanding powder which comprises a plurality of thermally expanding micro capsules having a low boiling point hydrocarbon contained within highly solvent-resistant shell walls which explode upon baking or drying, and about 10 parts of a vehicle mainly composed of epoxy resin and the second composition comprises, in parts by weight, about 0.2–2.5 parts of an epoxy type silane coupling agent based upon 100 parts of the zinc dust in the first composition. The coating after baking or drying has a plurality of voids resulting from the expansion and explosion of the micro capsules.

In another of its aspects, the present invention involves a surface treatment method for a part made from an iron-based alloy comprising the steps of degreasing and blasting the part; undercoating the part with an epoxy resin undercoating containing zinc dust; baking or drying the undercoating; and applying an overcoating to the part as a finish coat. The epoxy resin undercoating comprises a mixture of a first composition and second composition. The first composition comprises in parts by weight, about 20–200 parts of a zinc dust, about 0.05–0.5 parts of a thermally expanding powder which comprises a plurality of thermally expanding micro capsules having a low boiling point hydrocarbon contained within highly solvent-resistant shell walls which explode upon baking or drying, and about 10 parts of a vehicle mainly composed of epoxy resin, and the second composition comprises, in parts by weight, about 0.2–2.5 parts of an epoxy type silane coupling agent based upon 100 parts of the zinc dust. The undercoating is baked or dried to create a plurality of voids resulting from the expansion and explosion of the micro capsules, thereby producing limited porosity in the undercoating.

DETAILED DESCRIPTION OF THE PREFERRED EMBODIMENTS

The preferred embodiments of this invention will now be described.

The present invention relates to a method of surface treating a fastening part to provide a fastening part which is free from hydrogen embrittlement and which has improved corrosion resistance. The method comprises the step of coating or painting the part with an epoxy resin undercoating containing zinc dust. To paint the fastening part, standard techniques such as spray coating and dip coating can be employed. Further, when dip coating is used, the part can be spun (i.e., a "dip-spin" coating process) after impregnation in order to scatter any excess coating material through the use of centrifugal force. The dip-spin coating process is capable of providing a coating of relatively uniform film thickness without coating unevenness and, accordingly, is the technique most generally used as the painting method for fastening parts.

According to the present invention, the epoxy resin undercoating comprises a mixture of a first composition comprising, in parts by weight, about 20–200 parts of a zinc dust, about 0.05–0.5 parts of a thermally expanding powder, and about 10 parts of a vehicle mainly composed of an epoxy resin and a second composition comprising, in parts by weight, about 0.2–2.5 parts of an epoxy type silane coupling agent based upon 100 parts of the zinc dust.

The vehicle mainly composed of an epoxy resin is formed of a bisphenol type epoxy resin and one hardener selected from the group consisting of a polyamine resin, a polyamide resin, an amino resin, or a combination of any two or more of said polyamine resin, said polyamide resin, and said amino resin. The mixing ratio of bisphenol epoxy resin to hardener is not critical and, therefore, can be varied over a significant range while still providing the benefits of the present invention.

The bisphenol epoxy resin may comprise, for example, EPOTOHTO YD-134, EPOTOHTO YD-011, EPOTOHTO YD-014, and EPOTOHTO YD-017 (trade names manufactured by Toto Kasei Co., Ltd.) or EPIKOTE #834, EPIKOTE #1001, and EPIKOTE #1007 (trade names manufactured by Yuka Shell Epoxy Co., Ltd.), which have epoxy equivalents of 230–2100. The bisphenol epoxy resins may be used either alone or in a combination of any two or more.

The hardener may comprise, for example, a polyamine such as FUJICURE 6300 and FUJICURE FXR-1030 (trade names manufactured by Fuji Kasei Kogyo Co., Ltd.) and SUMICURE S (trade name manufactured by Sumitomo Chemical Co., Ltd.); a polyamide such as TOMIDE 210 (trade name manufactured by Fuji 15 Kasei Kogyo Co., Ltd.); a dicyandiamide such as DICYANEX-200 (trade name manufactured by ACI Japan Ltd.); an amino resin such as OMICURE 94 (trade name manufactured by ACI Japan Ltd.) and UBAN SE-60 (trade name manufactured by Mitsui Toatsu Chemicals, Inc.). The hardeners can be used either alone or in a combination of any two or more.

The zinc dust used in the epoxy resin undercoating according to the present invention preferably has an average particle size of about 3–8 $\mu$m. The particle size is significant because zinc dust having an average particle size of less than 3 $\mu$m is slightly inferior in corrosion resistance and zinc dust having an average particle size of more than about 8 $\mu$m easily settles out of the mixture thereby deleteriously affecting the storage stability of the coating.

The addition ratio of the zinc dust is set to about 20–200 parts by weight, and preferably to about 30–90 parts by weight, to 10 parts by weight of the vehicle mainly composed of an epoxy resin. When the addition ratio is less than about 20 parts by weight, the corrosion-preventing function of zinc is not sufficiently exhibited, and when the addition ratio exceeds about 200 parts by weight, the physical properties of the coating, including the ability of the coating to adhere to the part and the storage stability of the coating, are adversely affected.

The thermally expanding powder used in this invention will now be described. The present inventors found that when a small quantity of a thermally expanding powder is added to the epoxy resin undercoating and the resulting coating is applied to a fastening part by, for example, dip coating or dip-spin coating, and baked or dried with heat, the fastening part exhibits remarkably improved corrosion resistance compared to parts coated with an epoxy resin containing zinc dust which has no thermally expanding powder additive. The expanding powder comprises a plurality of thermally expanding micro capsules having a low boiling point hydrocarbon contained within highly solvent resistant shell walls which explode when subjected to heat, as during baking or drying. The improved corrosion resistance provided by the addition of the thermally expanding powder is believed to arise because expansion of the thermally expanding powder and the explosion of the plurality of micro capsules during baking causes the coating to become somewhat porous, thereby increasing the exposed surface area of the zinc particles in the coating so that the corrosion-preventing effect of zinc on the iron in the base alloy of the part by ionization or oxidation is enhanced. Oxidation of the zinc particles is achieved more easily than the iron of the fastening part and thus provides the self-sacrificial corrosion-resistance of zinc which increases the corrosion resistance provided by the coating. Further, this effect is more pronounced for sections of the part where the coating is thin, such as at or near sections of the part having edges. In addition to the self-sacrificial effect of the zinc powder, the coating provides a barrier effect which is the usual effect achieved by conventional corrosion-resisting coatings.

The thermally expanding powder used in this invention is a thermally expanding micro capsule comprising a highly solvent-resistant shell wall containing a low boiling point hydrocarbon. The shell wall insures that the thermally expanding powder has an adequate storage stability within the epoxy resin coating. Therefore, the thermally expanding powder will maintain its integrity for a sufficiently long period of time after being mixed with the remaining ingredients to form the epoxy resin coating. The thermally expanding powder preferably has a particle size of 50 $\mu$m or less, since particle sizes in excess of 50 $\mu$m deleteriously affect the smoothness of the resulting coating films. In addition, the expanding temperature of the thermally expanding powder must be within the useful range of baking temperatures of the coating. Further, the thermally expanding powder preferably has a maximum expansion magnification (volume) of 10 times or more. The expansion and explosion of the micro capsules during heating of the coating, i.e. during baking or drying, and the boiling off of the hydrocarbon leaves a plurality of voids in the coating and provides a coarse structure which has a degree of porosity sufficient to increase the exposed surface area of the zinc powder and enhance the oxidation effect.

The thermally expanding powder may comprise, for example, P-17, P-18, or P-19 (trade names manufactured by Dainichi Seika Colour & Chemicals Mfg. Co., Ltd.). Although azo- and ortho-BSH (benzenesulfonylhydrazide) thermally expanding powders are effective, they have an undesirably low storage stability within the epoxy resin coating and, accordingly, may not be appropriate for all uses.

Since the porosity tends to have a negative influence on the barrier effect, the addition ratio of the thermally expanding powder to the epoxy resin coating according to this invention must be within the range of about 0.05–0.5 parts by weight to 10 parts by weight of the vehicle mainly composed of epoxy resin. When the addition ratio is less than 0.05 parts by weight, the resulting coating film is not sufficiently porous and the desired corrosion-preventing oxidation effect is not achieved. When the addition ratio exceeds 0.5 parts by weight, the pore diameter within the resulting coating film becomes too large, so that corrosion resistance provided by the barrier effect is detrimentally affected and dot rust is easily developed.

The epoxy type silane coupling agent preferably comprises y-glycidoxypropyltrimethoxysilane or y-glycidoxypropylmethyldiethoxysilane. For example, KBM 403 and KBE 402 (trade names manufactured by Sin-Etsu Chemical Co., Ltd.) and SH 6040 (trade name manufactured by Dow Coming Toray Silicone Co., Ltd.) are preferably used.

The present inventor has determined that the benefits, to corrosion resistance and the ability of the coating to adhere to a part, provided by the present invention can be further improved by adding the epoxy type silane coupling agent to the epoxy resin coating. The improved properties provided by the coupling agent are believed to arise because the silane coupling agent facilitates the chemical bonding of the vehicle mainly composed of an epoxy resin to both the zinc dust and the iron in the base alloy of the part.

The addition ratio of the silane coupling agent in the epoxy resin coating according to this invention must be within the range of about 0.2–2.5 parts by weight to 100 parts by weight of the zinc dust. Addition ratios of less than about 0.2 parts by weight and exceeding about 2.5 parts by weight makes it difficult to attain the object of this invention.

The epoxy resin undercoating in accordance with the present invention may also contain resins other than epoxy resins such as phenoxy resins, acrylic resins, alkyd resins, polyurethane resins, silicone resins, petroleum resins, butyral resins, rosin, and the like; extenders such as talc, barium sulfide, mica, calcium carbonate, and the like; colored pigments such as titanium oxide, zinc oxide, chrome yellow, chromium oxide, iron oxide, carbon black, aluminum powder and the like; reinforcing materials such as glass fibers, glass flakes, mica, aluminum flakes, asbestos, synthetic silica and the like; and other additives generally used in paint such as thickeners, preservatives, settlement preventing agents, accelerators, and the like.

To dissolve or disperse the resin, a necessary quantity of a known solvent, such as an aromatic hydrocarbon, an aliphatic hydrocarbon, an ester, an ether, a ketone, an alcohol or the like may be used.

The epoxy resin undercoating in accordance with the present invention is applied to a part made from an iron-based alloy, after degreasing and blasting the part, as an undercoat by means of a dip-spin technique, impregnation, spray, brushing or the like so as to have a dried film thickness of about 10–30 µm. The coated part is then heated and dried at about 100–250° C., whereby the undercoating is cured.

The overcoat used in the surface treatment method of the present invention will now be described. The part, which has been coated by the epoxy resin undercoating, is painted with an overcoating which is applied as a finish coat to finally finish the surface treatment. The overcoat is provided to further improve the corrosion resistance of the part (specifically, alkali, acid, and/or weather resistance), to improve the durability of the part, to impart functions such as wear resistance and slidability to the part, or to match the color of the finished part to the color of a body to which the part is to be applied.

The overcoat used in this invention may comprise, for example, various types of coatings such as epoxy resin coatings, tar epoxy resin coatings, polyurethane resin coatings, alkyd resin coatings, acrylic resin coatings, acrylic silicone resin coatings, silicone resin coatings, fluorine resin coatings, and the like. However, the use of a baking type coating is preferred from the viewpoint of ease of manufacture.

According to the surface treatment of the present invention, a fastening part having excellent corrosion resistance and durability, which is free from delayed cracking by hydrogen embrittlement, can be provided.

EXAMPLES

This invention is further illustrated in more detail by referring to the following examples.

In Tables 1, 2, and 3, EPOTOHTO YD-011 and EPOTOHTO YD-014 are trade names of epoxy resins manufactured by Toto Kasei Co., Ltd. (epoxy equivalents of 450–500 and 900–1000, respectively); FUJICURE-6300 and TOMIDE 210 are trade names of polyamine and polyamide resins manufactured by Fuji Kasei Kogyo Co., Ltd.; and DICYANEX-200 and OMICURE-94 are trade names of dicyandiamide and amino resins manufactured by ACI Japan Ltd.

TABLE 1

|  | Examples | | | | | | | | |
|---|---|---|---|---|---|---|---|---|---|
|  | 1 | 2 | 3 | 4 | 5 | 6 | 7 | 8 | 9 |
| EPOTOHTO YD-011 | 93 | 93 | 93 | 93 | 93 | 93 | 93 | 93 | 93 |
| EPOTOHTO YD-014 |  |  |  |  |  |  |  |  |  |
| FUJICURE-6300 |  |  |  |  |  |  |  |  |  |
| TOMIDE 210 |  |  |  |  |  |  |  |  |  |
| DICYANEX-200 | 4 | 4 | 4 | 4 | 4 | 4 | 4 | 4 | 4 |
| OMICURE-94 | 3 | 3 | 3 | 3 | 3 | 3 | 3 | 3 | 3 |
| Zinc dust F-1000 | 200 | 200 | 200 | 300 | 400 | 900 | 1200 | 2000 | 2000 |
| SH6040 | 2 | 0.4 | 5 | 4 | 5 | 10 | 15 | 4 | 50 |
| P-17 | 2.5 | 0.5 | 5 | 2.5 | 2.5 | 2.5 | 2.5 | 0.5 | 5 |
| DISVALON #6900-20X | 15 | 15 | 15 | 20 | 25 | 30 | 35 | 40 | 40 |
| Xylene | 56 | 56 | 56 | 68 | 72 | 80 | 96 | 120 | 120 |
| Ethyl cellosolve | 42 | 42 | 42 | 51 | 54 | 60 | 72 | 90 | 90 |
| Isopropyl alcohol | 42 | 42 | 42 | 51 | 54 | 60 | 72 | 90 | 90 |
| Addition ratio of zinc dust | 20 | 20 | 20 | 30 | 40 | 90 | 120 | 200 | 200 |
| Addition ratio of thermally expanding powder | 0.25 | 0.05 | 0.50 | 0.25 | 0.25 | 0.25 | 0.25 | 0.05 | 0.50 |
| Addition ratio of silane coupling agent | 1.00 | 0.20 | 2.50 | 1.33 | 1.25 | 1.11 | 1.25 | 0.20 | 2.50 |
| Paint film thickness (flat part µm) | 15–20 | 12–15 | 20–25 | 15–20 | 15–20 | 15–20 | 15–20 | 12–15 | 20–25 |
| Result of salt spray test | ○ | ○ | ○ | ○ | ○ | ○ | ○ | ○ | ○ |

The addition ratios of zinc dust and thermally expanding powder are shown by the respective parts by weight to 10 parts by weight of vehicle, and the addition ratio of silane coupling agent is shown by the part by weight of silane coupling agent to 100 parts by weight of zinc dust.
The evaluation reference of salt spray test:
○: Rusting ratio after 200 hours is less than 0.1%
Δ: 0.1% to less than 1%
X: 1% or more

TABLE 2

| | Example | | | | | | | | |
|---|---|---|---|---|---|---|---|---|---|
| | 10 | 11 | 12 | 13 | 14 | 15 | 16 | 17 | 18 |
| EPOTOHTO YD-011 | 93 | 93 | 93 | 93 | 93 | 93 | 85 | 55 | |
| EPOTOHTO YD-014 | | | | | | | | | 96 |
| FUJICURE-6300 | | | | | | | 15 | | |
| TOMIDE 210 | | | | | | | | 45 | |
| DICYANEX-200 | 4 | 4 | 4 | 4 | 4 | 4 | | | 2 |
| OMICURE-94 | 3 | 3 | 3 | 3 | 3 | 3 | | | 2 |
| Zinc dust F-1000 | 400 | 400 | 400 | 400 | 400 | 400 | 400 | 400 | 400 |
| SH6040 | 0.8 | 5 | 10 | 0.8 | 5 | 10 | 5 | 5 | 5 |
| P-17 | 0.5 | 0.5 | 0.5 | 5 | 5 | 5 | 2.5 | 2.5 | 2.5 |
| DISVALON #6900-20X | 25 | 25 | 25 | 25 | 25 | 25 | 25 | 25 | 25 |
| Xylene | 72 | 72 | 72 | 72 | 72 | 72 | 72 | 72 | 72 |
| Ethyl Cellosolve | 54 | 54 | 54 | 54 | 54 | 54 | 54 | 54 | 54 |
| Isopropyl alcohol | 54 | 54 | 54 | 54 | 54 | 54 | 54 | 54 | 54 |
| Addition ratio of zinc dust | 40 | 40 | 40 | 40 | 40 | 40 | 40 | 40 | 40 |
| Addition ratio of thermally expanding powder | 0.05 | 0.05 | 0.05 | 0.50 | 0.50 | 0.50 | 0.25 | 0.25 | 0.25 |
| Addition ratio of silane coupling agent | 0.20 | 1.25 | 2.50 | 0.20 | 1.25 | 2.50 | 1.25 | 1.25 | 1.25 |
| Paint film thickness (flat part μm) | 10–12 | 12–15 | 12–15 | 20–25 | 20–25 | 20–25 | 15–20 | 15–20 | 15–20 |
| Result of salt spray test | ○ | ○ | ○ | ○ | ○ | ○ | ○ | ○ | ○ |

The addition ratios of zinc dust and thermally expanding powder are shown by the respective parts by weight to 10 parts by weight of vehicle, and the addition ratio of silane coupling agent is shown by the parts by weight of silane coupling agent to 100 parts by weight of zinc dust.
Evaluation reference of salt spray test:
○: Rusting ratio after 200 hours is less than 0.1%
Δ: 0.1% to less than 1%
X: 1% or more

TABLE 3

| | Comparative Example | | | | | | | | |
|---|---|---|---|---|---|---|---|---|---|
| | 1 | 2 | 3 | 4 | 5 | 6 | 7 | 8 | 9 |
| EPOTOHTO YD-011 | 93 | 93 | 93 | 93 | 93 | 93 | 93 | 93 | 93 |
| EPOTOHTO YD-014 | | | | | | | | | |
| FUJICURE-6300 | | | | | | | | | |
| TOMIDE 210 | | | | | | | | | |
| DICYANEX-200 | 4 | 4 | 4 | 4 | 4 | 4 | 4 | 4 | 4 |
| OMICURE-94 | 3 | 3 | 3 | 3 | 3 | 3 | 3 | 3 | 3 |
| Zinc dust F-1000 | 150 | 2400 | 400 | 400 | 400 | 400 | 400 | 400 | 400 |
| SH6040 | 2 | 24 | | 5 | 5 | 5 | | 0.5 | 15 |
| P-17 | 2.5 | 2.5 | | | 0.3 | 8 | 2.5 | 2.5 | 2.5 |
| DISVALON #6900-20X | 15 | 40 | 25 | 25 | 25 | 25 | 25 | 25 | 25 |
| Xylene | 56 | 120 | 72 | 72 | 72 | 72 | 72 | 72 | 72 |
| Ethyl cellosolve | 42 | 90 | 54 | 54 | 54 | 54 | 54 | 54 | 54 |
| Isopropyl alcohol | 42 | 90 | 54 | 54 | 54 | 54 | 54 | 54 | 54 |
| Addition ratio of zinc dust | 15 | 240 | 40 | 40 | 40 | 40 | 40 | 40 | 40 |
| Addition ratio of thermally expanding powder | 0.25 | 0.25 | 0 | 0 | 0.03 | 0.8 | 0.25 | 0.25 | 0.25 |
| Addition ratio of silane coupling agent | 1.33 | 1.00 | 0 | 1.25 | 1.25 | 1.25 | 0 | 0.13 | 3.75 |
| Paint film thickness (flat part μm) | 15–20 | 12–15 | 6–8 | 8–10 | 10–12 | 20–25 | 12–15 | 12–15 | 15–20 |
| Result of salt spray test | X | X | X | X | X | X | X | X | X |

The addition ratios of zinc dust and thermally expanding powder are shown by the respective parts by weight to 10 parts by weight of vehicle, and the addition ratio of silane coupling agent is shown by the part by weight of silane coupling agent to 100 parts by weight of zinc dust.
Evaluation reference of salt spray test:
○: Rusting ratio after 200 hours is less than 0.1%
Δ: 0.1% to less than 1%
X: 1% or more In Tables 1, 2, and 3, F-1000 is the trade name of a zinc dust (average particle size: 4.9±0.3 μm) manufactured by The Honjo Chemical Corporation; P-17 is the trade name of a thermally expanding powder (particle size: 15–200 μm) manufactured by Dainichi Seika Colour & Chemicals Mfg. Co., Ltd.; and SH6040 is the trademark of a silane coupling agent manufactured by Dow Corning Toray Silicone Co., Ltd.

Further, in Tables 1, 2, and 3, DISVALON #6900-20X is the trade name of a settlement preventing agent manufactured by Kusumoto Chemicals Ltd.

The blended coating compositions shown in Tables 1, 2, and 3 (Examples 1–18 and Comparative Examples 1–9) were dispersed by a sand mill and regulated in viscosity with a diluting thinner (a mixture of 40 parts by weight of xylene, 30 parts by weight of ethyl cellosolve, and 30 parts by weight of isopropylalcohol) so as to have a viscosity of 52.5±10 cP (centi-Poise) at 20° C.

The resulting compositions were tested by applying the coatings to sample steel bolts (M 12×50) which were degreased twice using xylene and sandblasted (sand coarse: #1000). The coatings were applied to the degreased and blasted sample bolts using a dip-spin coating technique. The spin coating was performed at a circumferential speed of 640 m/min (1700 rpm) and the baking of the coating was performed using a 2-coat/2-bake process for 30 minutes at 170° C. The thus-obtained various sample bolts (N=4) were subjected to salt spray test by JIS Z 2371 (spraying 5% saline solution at 35° C. The results are shown in Tables 1, 2, and 3.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. In combination with a fastening part made from an iron alloy, a baked or dried epoxy resin coating adapted to be formed over an exterior surface of the fastening part, the epoxy resin coating comprising, in parts by weight, about 20–200 parts of a zinc dust, about 0.05–0.5 parts of a thermally expanding powder, and about 10 parts of a vehicle comprised of an epoxy resin operable to be dissolved or dispersed by a solvent, prior to baking or drying said thermally expanding powder in the epoxy resin coating comprising a plurality of thermally expanding micro capsules containing a hydrocarbon within shell walls, which explode upon baking or drying and after baking or drying said thermally expanding powder in the epoxy resin coating comprising exploded shell walls and voids in the coating resulting from the expanding and explosion of the shell walls, said voids causing the coating to be porous, increasing the exposed surface area of the zinc dust in the coating.

2. The coating according to claim 1 wherein the vehicle comprises a bisphenol epoxy resin and one hardener selected from the group consisting of a polyamine resin, a polyamide resin, a dicyandiamide resin, an amino resin, and any combination of two or more of said polyamine resin, said polyamide resin, said dicyandiamide resin, and said amino resin.

3. An epoxy resin coating comprising a mixture of a first composition made according to claim 1 and a second composition comprising, in parts by weight, about 0.2–2.5 parts of an epoxy silane coupling agent based upon 100 parts of the zinc dust in said first composition.

4. The coating according to claim 3 wherein the vehicle comprises a bisphenol epoxy resin and one hardener selected from the group consisting of a polyamine resin, a polyamide resin, a dicyandiamide resin, an amino resin, and any combination of two or more of said polyamine resin, said polyamide resin, said dicyandiamide resin, and said amino resin.

5. The coating according to claim 3 wherein the silane coupling agent comprise y-glycidoxypropyltrimethoxysilane.

6. The coating according to claim 3 wherein the silane coupling agent comprises y-glycidoxypropyltrimethyldiethoxysilane.

7. A baked or dried fastening part comprising a fastening part made from an iron alloy and an epoxy resin coating formed over an exterior surface of the fastening part, the epoxy resin coating comprising, in parts by weight, about 20–200 parts of a zinc dust, about 0.05–0.5 parts of a thermally expanding powder, and about 10 parts of a vehicle comprised of an epoxy resin operable to be dissolved or dispersed by a solvent, prior to baking or drying said thermally expanding powder In the epoxy resin coating comprising a plurality of thermally expanding micro capsules containing a hydrocarbon within shell walls which explode upon baking or drying, and after baking or drying said thermally expanding powder in the epoxy resin coating comprising exploded shell walls and voids in the coating resulting from the expanding and explosion of the shell walls, said voids causing the coating to be porous, increasing the exposed surface area of the zinc dust in the coating.

8. A baked or dried fastening part comprising a fastening part made from an iron alloy and an epoxy resin coating formed over an exterior surface of the fastening part, the epoxy resin coating comprising a mixture of a first composition and a second composition, said first composition comprising, in parts by weight about 0.05–0.5 parts of a thermally expanding powder, about 20–200 parts of a zinc dust, and about 10 parts of a vehicle comprised of an epoxy resin operable to be dissolved or dispersed by a solvent, prior to baking or drying at a given temperature said thermally expanding powder in the epoxy resin coating comprising a plurality of thermally expanding micro capsules containing a hydrocarbon within shell walls which explode upon baking or drying, and after baking or drying said thermally expanding powder in the epoxy resin coating comprising exploded shell walls and a plurality of voids in the coating resulting from the expansion of the micro capsules and explosion of the shell walls resulting from the boiling-off of the hydrocarbon during the baking or drying, said voids causing the coating to be porous, increasing the exposed surface area of the zinc dust in the coating, and said second composition comprising, in parts by weight, about 0.2–2.5 parts of an epoxy silane coupling agent based on 100 parts by weight of the zinc dust in said first composition.

9. A method for treating a fastening part made from an iron alloy comprising the step of coating the part with an epoxy resin undercoating containing zinc dust, the epoxy resin undercoating comprising, in parts by weight, about 20–200 parts of a zinc dust, about 0.05–0.5 parts of a thermally expanding powder, and about 10 parts of a vehicle comprised of epoxy resin operable to be dissolved or dispersed by a solvent, said thermally expanding powder comprising a plurality of thermally expanding micro capsules containing a hydrocarbon within shell walls which explode upon baking or drying, and baking or drying said coated part at or above said given temperature and causing said shell walls of the micro capsules to expand and explode, the explosion of the micro capsules creating voids causing the coating to be porous, increasing the exposed surface area of the zinc dust In the coating, and also creating exploded side walls within said coating.

10. The method according to claim 9 further comprising the preliminary step of degreasing and blasting the part prior to coating the part with the epoxy resin undercoating.

11. The method according to claim 9 further comprising the subsequent step of applying a second coating to the part as a finish coat.

12. A method for treating a fastening part made from an iron alloy comprising the step of coating the part with an epoxy resin undercoating containing a zinc dust, the epoxy resin undercoating comprising a mixture of a first composition, and a second composition said first composition comprising, in parts by weight, about 10 parts of a vehicle comprised of an epoxy resin operable to be dissolved or dispersed by a solvent, about 20–200 parts of a zinc dust, about 0.05–0.5 parts of a thermal expanding powder, said thermally expanding powder comprising a plurality of thermally expanding micro capsules containing a hydrocarbon within shell walls which explode upon baking or drying, and said second composition comprising, in parts by weight, about 0.2–2.5 parts of an epoxy silane coupling agent based upon 100 parts by weight of the zinc dust and baking or drying said coated part at or above said given temperature and causing said shell walls of the micro capsules to explode, the explosion of the micro capsules creating voids causing the coating to be porous, increasing the exposed surface area of the zinc dust in the coating, and also creating exploded side walls within said coating.

13. The method according to claim 12 further comprising the preliminary step of degreasing and blasting the part prior to coating the part with the epoxy resin undercoating.

14. The method according to claim 12 further comprising the subsequent step of applying a second coating to the part as a finish coat.

* * * * *